United States Patent [19]

Kruzic et al.

[11] 4,068,287
[45] Jan. 10, 1978

[54] CIRCUIT BREAKER WITH IMPROVED TERMINAL CONNECTION MEANS

[75] Inventors: Zelko J. Kruzic, New Brighton; James O. Rexroad, Beaver, both of Pa.

[73] Assignee: Westinghouse Electric Corporation, Pittsburgh, Pa.

[21] Appl. No.: 659,870

[22] Filed: Feb. 20, 1976

Related U.S. Application Data

[63] Continuation of Ser. No. 620,607, Oct. 8, 1975, abandoned, which is a continuation of Ser. No. 473,964, May 28, 1974, abandoned, which is a continuation-in-part of Ser. No. 316,636, Dec. 19, 1972, abandoned.

[51] Int. Cl.² ............................................. H02B 1/20
[52] U.S. Cl. .................................. 361/341; 361/378; 174/88 B; 339/22 B
[58] Field of Search .................. 174/71 B, 88 B, 88 S; 339/22 B; 200/50 AA; 317/112, 119, 120; 361/341, 342, 378

[56] References Cited

U.S. PATENT DOCUMENTS

| | | | |
|---|---|---|---|
| 3,026,396 | 3/1962 | Fisher | 174/88 B |
| 3,343,042 | 9/1967 | Cellerini | 200/50 AA |
| 3,408,454 | 10/1968 | Fouse | 339/22 B |
| 3,626,253 | 12/1971 | Sturdivan | 317/120 |
| 3,657,606 | 4/1972 | Gregor et al. | 200/50 A |
| 3,681,545 | 8/1972 | Cellerini et al. | 200/50 AA |

Primary Examiner—Gerald P. Tolin
Attorney, Agent, or Firm—L. P. Johns

[57] ABSTRACT

A circuit breaker structure characterized by a multiple-pole circuit breaker which is adapted for quick removal and/or replacement of a circuit breaker having at least two horizontally spaced poles, each pole comprising two vertically spaced incoming and outgoing terminals or disconnecting contact assemblies, each terminal comprising a plurality of horizontally spaced terminal members or fingers which are vertically disposed, the terminals being adapted to connect with a plurality of spaced incoming and outgoing bus conductors comprising upper and lower sets of conductor members or fingers which are interengageable with the terminal fingers of the corresponding terminals, each set of upper and lower incoming and outgoing terminals having aligned apertures, each set of upper and lower incoming and outgoing conductor fingers having aligned slots, a first insulated bolt and nut assembly extending through the aligned apertures of the upper set of terminal fingers and having insulating spacers between horizontally spaced terminals, and a second insulated bolt and nut assembly extending through the apertures of the lower set of terminal fingers and having insulating spacings between each terminal, whereby upon tightening of the bolt and nut assembly, the terminal fingers and conductor fingers are retained in tight electrically conductive surface-to-surface contact with each other.

8 Claims, 4 Drawing Figures

CIRCUIT BREAKER WITH IMPROVED TERMINAL CONNECTION MEANS

This is a continuation of application Ser. No. 620,607 filed Oct. 8, 1975; which is a continuation of application Ser. No. 473,964 filed May 28, 1974 now abandoned; which is a continuation-in-part of application Ser. No. 316,636 filed Dec. 19, 1972; now abandoned.

CROSS-REFERENCE TO RELATED APPLICATION

This invention is related to an invention disclosed in the application of James O. Rexroad and Louis N. Ricci, Ser. No. 316,635, filed Dec. 19, 1972, is a continuation-in-part of application Ser. No. 316,636, filed Dec. 19, 1972; and is a continuation of application Ser. No. 620,607, filed Oct. 8, 1975, now abandoned.

BACKGROUND OF THE INVENTION

Field of the Invention

This invention relates to switchgear and more particularly to a bolted joint connection between terminals of a circuit breaker and the bus conductors to which the circuit breaker is connected.

2. DESCRIPTION OF THE PRIOR ART

Circuit breakers having larger ratings such as the drawout type breaker or metal-enclosed switchgear, are provided with multiple connectors on each pole to multiply the number of contacting areas in order to minimize electrical resistance and the resulting heat generated thereby. In the past, various means have been provided for minimizing the electrical resistance developed at the joint between the pole terminals and the load and line bus conductors, including bolted joints and the like. A disadvantage with the particular type of bolted joints used heretofore has been the relative inaccessibility of the bolted connections when a particular circuit breaker is installed or withdrawn from service. Most prior bolted connections have necessitated not only access to the terminal or rear side of the circuit breaker, but also a requirement for turning off the power for safety reasons.

Associated with the foregoing has been a problem of inserting multi-pole circuit breakers into operating position. Circuit breakers having two or more poles are not always readily inserted into position, because each pole includes incoming and outgoing terminal fingers with a plurality of interfitting bus conductor fingers. A tight fit between the fingers of the bus conductors and terminals is necessary for satisfactory electrical conductivity. On the other hand, the greater the number of interfitting conductor fingers and terminal fingers, the greater the effort necessary to install the circuit breaker in place. Manifestly, where only two interfitting bus conductor fingers are involved for a single joint, the amount of effort required for assembling the conductors is minimal, such as for conductors of a bus duct as disclosed in U.S. Pat. No. 3,408,454, issued Oct. 29, 1968, to S. S. Fouse.

SUMMARY OF THE INVENTION

It has been found in accordance with this invention that the foregoing problem may be overcome by providing a circuit breaker structure having a multi-pole circuit breaker with at least two vertically spaced incoming and outgoing terminals comprising a plurality of vertical terminal fingers, the terminal fingers being interengageable with corresponding fingers of at least two vertically spaced incoming and outgoing bus conductors, the terminal fingers of the incoming terminals having aligned apertures through which an insulated bolt of a nut and bolt assembly extends, the terminal fingers of the outgoing terminals having aligned apertures through which an insulated bolt of another nut and bolt assembly extends, the fingers of the bus conductors having slots for receiving the bolts when the terminal fingers and conductor fingers are interengaged, there being insulating spacers on each bolt between the spaced terminals, and the bolts being of a sufficient length that the nuts mounted thereon are accessible from the front side of the circuit breaker.

The advantage of the circuit breaker terminal connection of this invention is that the bolted joint electrical connections for the terminals of a circuit breaker of substantial size are easily accessible for connection and disconnection from the front of the circuit breaker in order to readily remove and replace a circuit breaker, such as when burned contacts develop, without turning off the power. This is particularly true where circuit breakers having a rating of 600 volts or more are involved which breakers comprise at least three terminal fingers for each pole terminal.

DESCRIPTION OF THE PREFERRED EMBODIMENT

Figure 1:
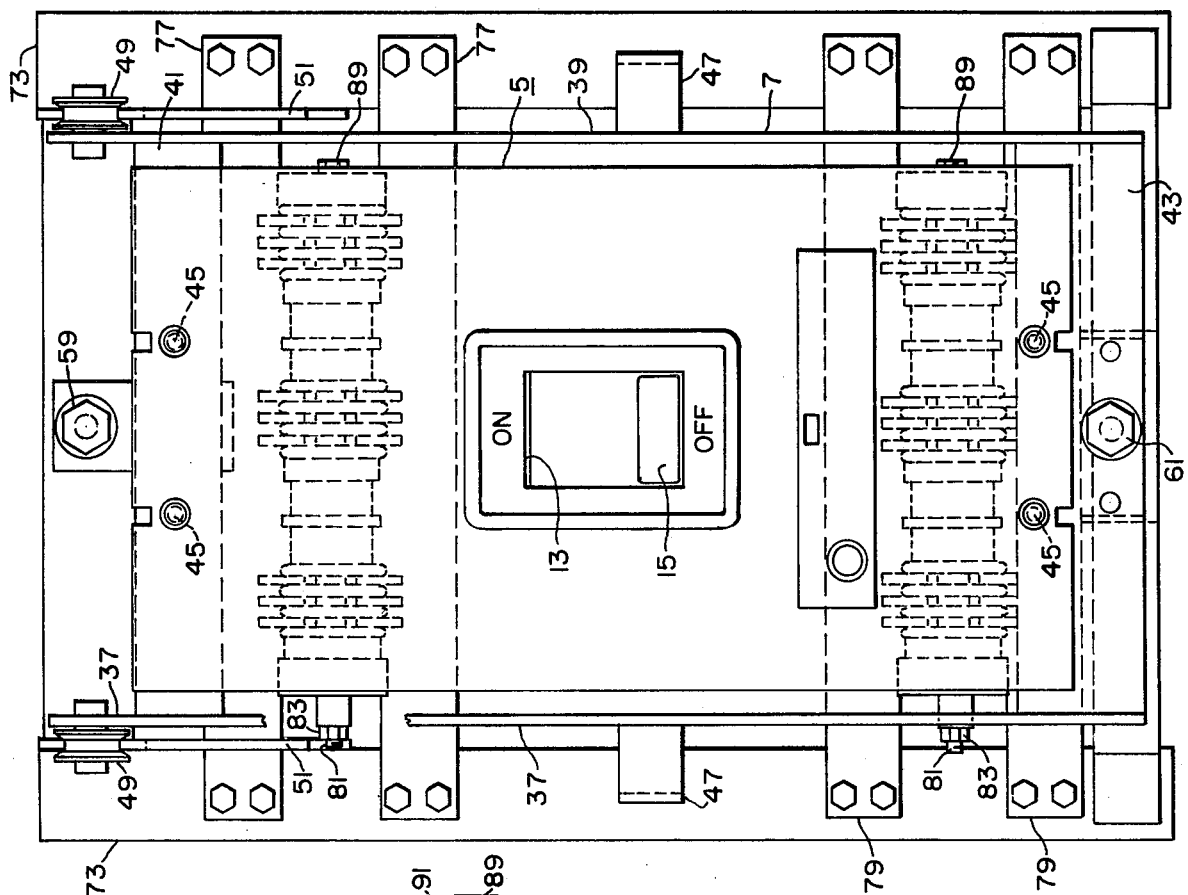
FIG. 1 is a front elevational view of a circuit breaker within a mounting frame.

In FIG. 1, a circuit breaker generally indicated at 5, is shown mounted on a mounting frame or case 7. As shown more particularly in FIG. 2, the circuit breaker 5 is a large molded case type of breaker, having a rating of about 600 volts, such as disclosed in Canadian Pat. No. 693,476, issued Sept. 1, 1964 for which reason only a limited description is included herewith. The circuit breaker 5 includes an enclosure comprising a base 9, a removable cover 11, both of which may be molded from suitable insulating material such as a thermosetting resin. The cover 11 includes an opening 13 through which a manually operated handle 15 extends, which handle is shown in the off position in FIG. 2.

Figure 2:
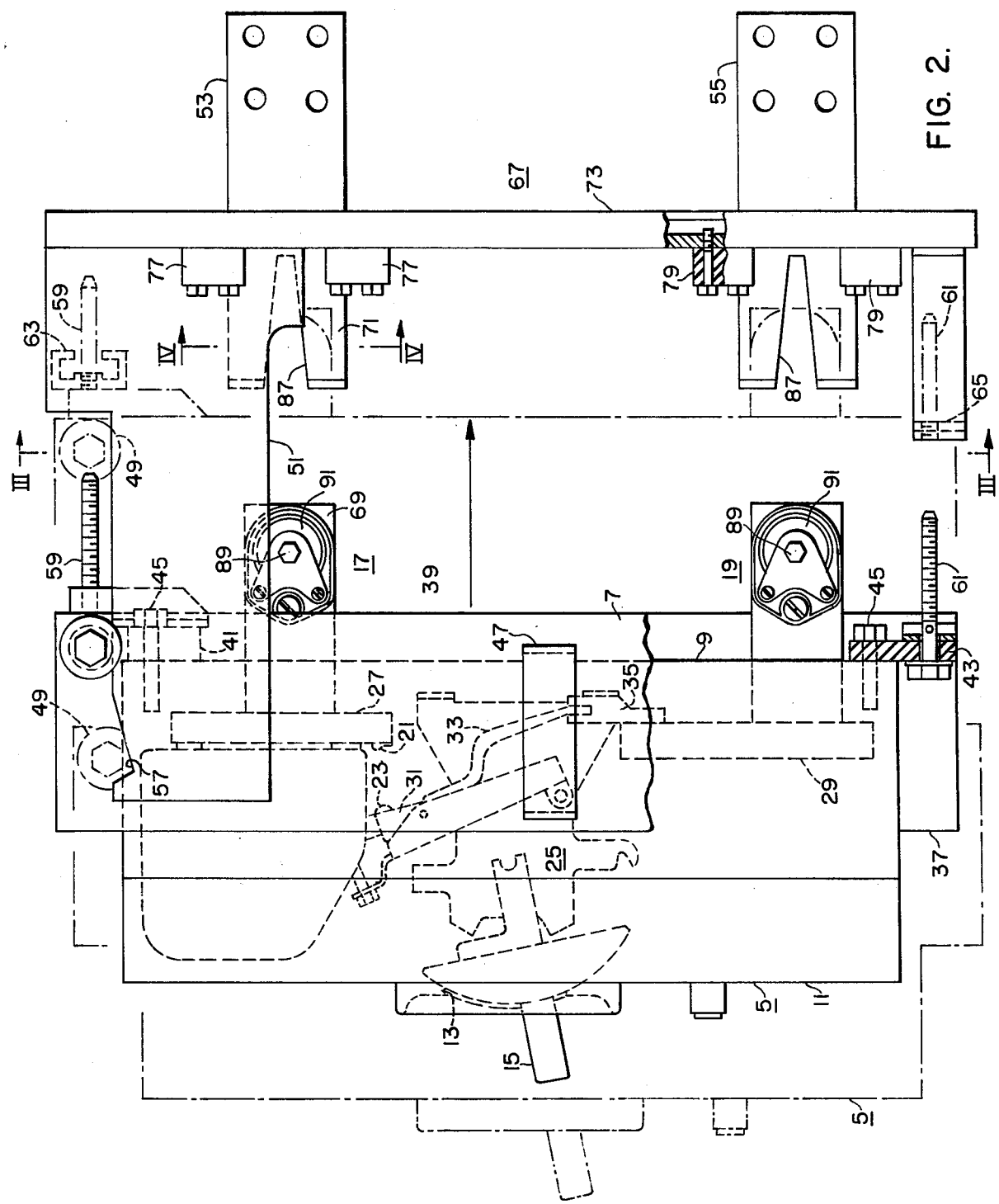
FIG. 2 is a side elevational view, with parts broken away, showing the manner in which the circuit breaker is mounted prior to connection with incoming and outgoing bus conductors.

The circuit breaker is of the three-pole type, each pole being provided with incoming and outgoing terminal structures or terminals indicated generally at 17 and 19 at spaced locations on the base 9. The circuit breaker includes, for each pole unit, a stationary contact 21 and a movable contact 23. A common operating mechanism, indicated generally at 25, is provided for simultaneous actuation of the three movable contacts to open and closed positions of the contacts 21 and 23 upon manual operation of the handle 15. As shown in FIG. 2, the terminal structures 17 and 19 are attached to stationary conductors 27 and 29, respectively, which are secured by suitable means to the base 9. A path of travel of the circuit through the breaker extends from the terminal structure 17 to the conductor 27, the stationary contact 21, the movable contact 23, a contact arm 31, flexible conductors or shunts 33, a conducting strip 35, the conductor 29, and the terminal structure or terminal 19.

The mounting frame 7, as shown in FIGS. 1 and 2, is a rectangular structure including spaced vertical frame members 37 and 39 and horizontal insulating members 41 and 43 which extend between and are attached to the frame members in a suitable member such as by screws (not shown). The circuit breaker 5 is mounted on the frame by similar screws 45 in the horizontal members 41 and 43. The frame includes a pair of similar handles 47 on the opposite frame members 37 and 39 by which the circuit breaker may be lifted into a mounting position. For that purpose, rollers 49 are attached to the upper end of the frame members 37 and 39 which rollers are mounted on similar spaced tracks 51 for moving the terminals 17 and 19 into engagement with corresponding bus conductors 53 and 55.

In the retracted position, as shown in FIG. 2, the terminals 17 and 19 are in alignment with but not in engagement with the bus conductors 53 and 55. To engage the terminals and conductors, the circuit breaker 5 is moved by rolling the assembly of the circuit breaker and frame along the tracks 51 to the broken line position of the roller 49 in which position the terminals 17 and 19 are in electrical contact with the bus conductors 53 and 55, respectively. For convenience, each track 51 is provided with a notch 57 to prevent the assembly of the circuit breaker 5 and the frame 7 from accidentally rolling off of the end of the track 51. In addition, the frame 7 is provided with upper and lower lock-in bolts 59 and 61 which are accessible from the front side of the circuit breaker and which engage bolt-receiving members 63 and 65, respectively, on a bracket 67.

Figure 4:
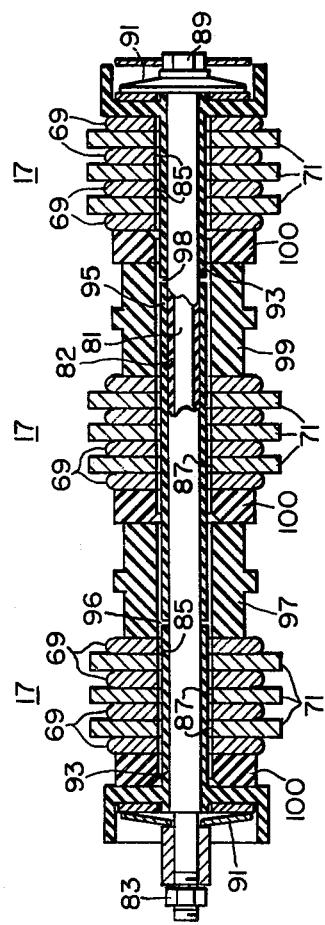
FIG. 4 is a vertical sectional view taken on the line IV—IV of FIG. 2 when the circuit breaker is fully connected.

As shown in FIG. 4, the terminals 17 for the three poles of the circuit breaker 5 include a plurality of spaced portions or terminal fingers 69 of similar construction which are plate-like members and which extend horizontally from the conductor 29. The terminal fingers 69 have generally flat planar surfaces and are disposed along generally vertical planes. The spacing between the several fingers 69 is substantially equal to the thickness of conductor fingers 71 of the bus conductor 53, so that when the terminals 17 are in electrical contact with the bus conductors 53, the terminal fingers 69 and the conductor fingers 71 are in complete interfitting engagement and surface-to-surface contact as shown in FIG. 4. For good electrical conductivity between the terminals and conductors there are preferably at least three interengaging conductor and terminal fingers 69 and 71 so that there is sufficient total surface contact between them.

Figure 3:
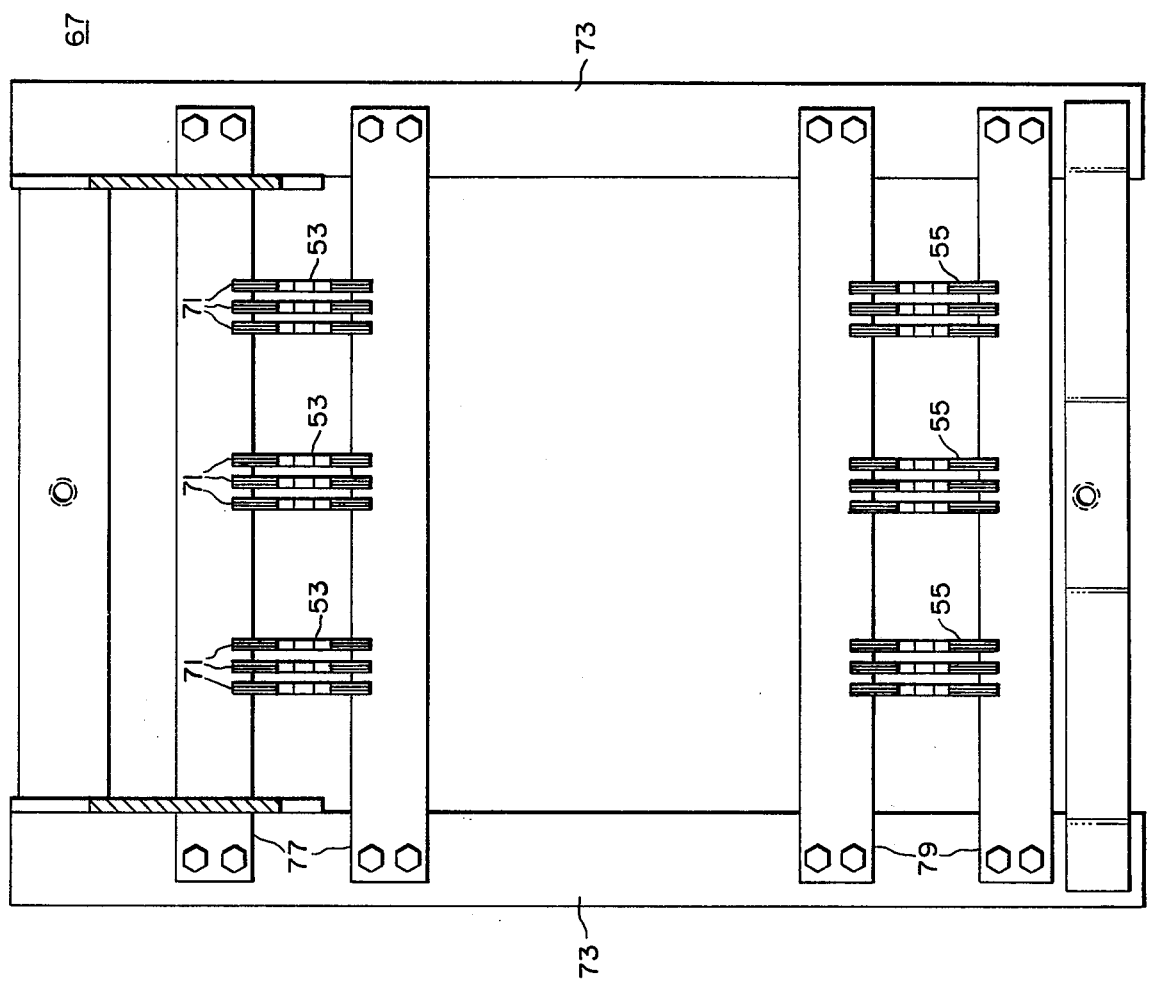
FIG. 3 is a vertical sectional view taken on the line III—III of FIG. 2.

In FIGS. 2 and 3, the bracket 67 includes a pair of spaced vertical members 73, as well as spaced pairs of mounting bars 77 and 79 on which the spaced bus conductors 53 and 55 are mounted, respectively. The bars 77 and 79 are composed of insulating material. The right ends of the conductors 53 and 55, remote from the frame 67, are electrically connected to load and line conductors in a conventional manner.

As shown in FIG. 4, releasable clamping means, such as a bolt and nut assembly comprising bolt 81 and a nut 83, are provided for holding the interfitting terminal fingers 69 and conductor fingers 71 in tight surface-to-surface contact to reduce electrical resistance and thereby avoid heat there would be otherwise developed between the interfitting members. For that purpose, the terminal fingers 69 are provided with aligned apertures 85 through which the bolt 81 extends. As shown in FIG. 2, each conductor finger 71 includes a substantially horizontally disposed slot 87 which receives the bolt 81 when the fingers 69 and 71 are assembled as shown in FIG. 4.

In FIG. 4, the bolt 81 includes a head 89 and is assembled in place with a washer 91 at each end together with spacer and insulation means including a pair of flanged sleeves 93, a tubular sleeve 95, and insulating spacers 97 and 99. The sleeves 93, 95 and the spacers 97, 99 are composed of electrically insulating material. The sleeves 93 and 95 insulate the bolt 81 from the several terminal and conductor fingers 69 and 71. The spacers 97 and 99 cooperate with the bolt 81 and nut 83 to clamp the fingers 69 and 71 tightly together in electrically conductive surface-to-surface contact. Spacings 96 and 98 are provided at each end of the tubular sleeve 95 to enable tightening of the bolt without jamming the ends of the sleeves 93 and 95 together. The spacings 96 and 98 are located radially within the spacers 97 and 99 for safety and to increase the electrically insulating creepage path or distance between the electrically conducting terminal fingers of the adjacent pole units or different phases of the overall circuit breaker. The bolt 81 may be provided with additional insulation means such as a tube 82 that is coextensive with the bolt, which tube is composed of electrically insulating material such as nylon to increase the electrically insulating creepage path between the terminals. An alternative to the tube 82 would be a coating of electrically insulating material on the bolt 81. In addition, spacers 100 may be provided on the bolt adjacent to each terminal structure in order to reserve space on the bolt for additional terminal fingers 69 and conductor fingers 71.

As shown in FIG. 1, the nuts 83 of the nut and bolt assembly preferably extend slightly beyond opposite side walls of the frame 7 for easy wrench access. The threaded end portions of the bolts 81 with the nuts 83 attached thereto are disposed to enable tightening of the bolts at one side of the circuit breaker. As shown in FIG. 2, the nut and bolt assemblies are located at the rear side of the circuit breaker, but due to the extension of the threaded end portion of the bolt beyond the side wall, the nuts 83 are accessible from the front side (FIG. 1) of the frame or case 7. Thus, the circuit breaker may be installed and removed by an operator who is located at the front side and without having to move to the side or rear of the circuit breaker. The bolt heads 89 are preferably captive and require no wrench. When the assembly is tightened into place, a torque wrench is preferably used to provide a "no-resistance" joint between the fingers 69 and 71. In an alternative embodiment, the nut and bolt assembly may be mounted on the conductor fingers 71 instead of the terminal fingers 69 by providing the conductor fingers with apertures instead of slots 87 and providing the terminal fingers 69 with such slots.

In conclusion, the device of this invention provides for a structure that facilitates assembly and disassembly of conductors both at the line and load ends of a circuit breaker by providing clamping means, such as a nut and bolt assembly, which are accessible from the front side of the circuit breaker and thereby avoids the necessity of personnel having to enter the rear (high voltage) area of of the breaker. Another advantage of frontal accessibility to the nut and bolt assembly is avoidance of the necessity of turning of the power which is particularly advantageous where other circuit breakers are in use. Finally, the assembly of the nut, bolt, and terminal spacers maintains the terminals at proper spacing to enable the application of the necessary pressure between the interfitting fingers, whereby an increase in ampere rating is available without changing the shunts or contacts or circuit breaker mechanism.

What is claimed:

1. A circuit breaker structure comprising a multi-pole circuit breaker and spaced bus conductors, said circuit breaker comprising a stationary contact and a movable contact for each pole, manually operable handle means for opening and closing the contacts, an insulating housing comprising front and rear end walls and opposite side walls, each pole for the circuit breaker comprising at least two vertically spaced incoming and outgoing terminals at the rear end wall, each terminal comprising at least one terminal finger, the spaced bus conductors comprising spaced incoming and outgoing conductor members each comprising at least one conductor finger interengageable with the at least one terminal finger of a corresponding terminal, the incoming terminal for all poles being horizontally spaced and aligned on one horizontal axis, the outgoing terminals for all poles being horizontally spaced and aligned on another horizontal axis and vertically spaced from that of the incoming terminals, first conductor means leading from each stationary contact to the corresponding incoming terminal, second conductor means leading from each movable contact to the corresponding outgoing terminal, the conductor means for each of the incoming and outgoing terminals of each pole being spaced apart, first releasable clamping means for holding the incoming terminal fingers in tight electrical surface-to-surface contact with corresponding conductor fingers, second releasable clamping means for holding outgoing terminal fingers in tight electrical surface-to-surface contact with the corresponding conductor fingers, the first clamping means comprising an elongated bolt and nut assembly for all poles, the second clamping means comprising another elongated bolt and nut assembly for all poles, dielectric spacer means on each bolt and between the terminals, and at least one of the nut and bolt end portions of each of said clamping means being disposed externally of the side walls and front elevational-view dimensions of the housing so that at least one of the nut and bolt end portions is accessible from the front end wall of said circuit breaker to receive a securing member that may be used to removably secure or release said assembly.

2. The circuit breaker structure of claim 1 in which the interengaged terminal fingers and conductor fingers have aligned opening means and in which the bolt and nut assemblies extend through the corresponding opening means.

3. The circuit breaker structure of claim 1 in which the nuts of said assembly are disposed outside of the front-elevational-view dimensions of said housing.

4. The circuit breaker structure of claim 1 in which the nuts of said assembly extend beyond the side wall of the housing.

5. The circuit breaker structure of claim 1 in which the bolt is enclosed in an electrically insulating member.

6. The circuit breaker structure of claim 1 including track means for supporting movement of said circuit breaker terminals in alignment with said corresponding bus conductor terminals.

7. The circuit breaker structure of claim 6 in which draw-in bolt means are provided for moving the circuit breaker terminals into tight electrical contact with the bus conductor terminals.

8. The circuit breaker structure of claim 7 in which the draw-in bolts are aligned with the direction of movement of the circuit breaker with respect to the bus conductor terminals.

* * * * *